US012573087B2

(12) United States Patent
Rougier et al.

(10) Patent No.: US 12,573,087 B2
(45) Date of Patent: Mar. 10, 2026

(54) OBJECT THREE-DIMENSIONAL LOCALIZATIONS IN IMAGES OR VIDEOS

(71) Applicant: Hinge Health, Inc., San Francisco, CA (US)

(72) Inventors: Caroline Rougier, Montreal (CA); Colin Joseph Brown, Saskatoon (CA)

(73) Assignee: Hinge Health, Inc., San Francisco, CA (US)

( * ) Notice: Subject to any disclaimer, the term of this patent is extended or adjusted under 35 U.S.C. 154(b) by 373 days.

(21) Appl. No.: 18/327,722

(22) Filed: Jun. 1, 2023

(65) Prior Publication Data

US 2023/0306636 A1 Sep. 28, 2023

Related U.S. Application Data

(63) Continuation of application No. PCT/IB2020/061548, filed on Dec. 4, 2020.

(51) Int. Cl.
*G06T 7/73* (2017.01)

(52) U.S. Cl.
CPC ...... *G06T 7/74* (2017.01); *G06T 2207/30196* (2013.01)

(58) Field of Classification Search
CPC ... G06T 7/74; G06T 2207/30196; G06T 7/73; G06T 3/06; G06V 20/647; G06V 20/64
See application file for complete search history.

(56) References Cited

U.S. PATENT DOCUMENTS

| | | |
|---|---|---|
| 2012/0148100 A1 | 6/2012 | Kotake et al. |
| 2018/0075593 A1 | 3/2018 | Wang et al. |

(Continued)

FOREIGN PATENT DOCUMENTS

| | | |
|---|---|---|
| CN | 112017236 A | 12/2020 |
| JP | 2014137725 A | 7/2014 |

(Continued)

OTHER PUBLICATIONS

Carvalho Mendes, Jose Antonio, "Forensic use of Mobile Phone Cameras: Measuring the Height of a Person", Thesis to obtain the Master of Science Degree in Electrical and Computer Engineering, XP093114125, Lisbon,Retrieved from the Internet:URL:https://people.kth.se/-miraldo/msc_thesis/2017_Forensic_use_of_Mobile_Phone_Cameras.pdf;retrieved on Dec. 20, 2023, Oct. 2017, 75 pages.

(Continued)

*Primary Examiner* — Xiao Liu
*Assistant Examiner* — Vaisali Rao Koppolu
(74) *Attorney, Agent, or Firm* — Perkins Coie LLP; Andrew T. Pettit

(57) ABSTRACT

An apparatus is provided. The apparatus includes a communications interface to receive raw data. The raw data includes a representation of an actual object in two-dimension. The apparatus further includes a memory storage unit to store the raw data and reference data. In addition, the apparatus includes a scale estimation engine to receive the raw data and the reference data. The scale estimation engine is to calculate a first root position of the actual object in a three-dimensional space based on an analysis of the raw data with the reference data. Furthermore, the apparatus includes an aggregator to generate output data based on the first root position. The output data is to be transmitted to an external device.

12 Claims, 6 Drawing Sheets

(56) References Cited

U.S. PATENT DOCUMENTS

| | | | | |
|---|---|---|---|---|
| 2020/0005490 A1* | 1/2020 | Paik | ............................ | G06T 7/80 |
| 2021/0174539 A1* | 6/2021 | Duong | ...................... | G06N 5/01 |
| 2021/0192783 A1* | 6/2021 | Huelsdunk | ................ | G06T 7/75 |
| 2022/0351378 A1* | 11/2022 | Kamiyama | ........... | G06V 10/255 |
| 2023/0298204 A1* | 9/2023 | Wang | ......................... | G06T 7/75 |
| | | | | 345/419 |

FOREIGN PATENT DOCUMENTS

| | | |
|---|---|---|
| JP | 2019009752 A | 1/2019 |
| WO | 2018235923 A1 | 12/2018 |

OTHER PUBLICATIONS

Ando, et al., "A Method for Estimating 3D Position and Camera Self-Calibration Based on Results of Human Detection", SSII2010 Proceedings of the 16th Symposium on Sensing via Image Information., 2010, 1-8.

Gu, et al., "Multi-Person Hierarchical 3D Pose Estimation in Natural Videos", IEEE Transactions on Circuits and Systems for Video Technology, vol. 30 Issue 11., 2020, 4245-4257.

Kang J. et al., "Tracking objects from multiple stationary and moving cameras," Published in: IEEE Intelligent Distributed Surveillance Systems, https://doi.org/10.1049/ic:20040094, pp. 31-35, Feb. 23, 2004.

Yuan, Chang et al., "3D Reconstruction of Background and Objects Moving on Ground Plane Viewed from a Moving Camera," Published in: 2006 IEEE Computer Society Conference on Computer Vision and Pattern Recognition (CVPR'06), https://doi.org/10.1109/CVPR.2006.16, 8 pages, Jun. 22, 2006.

* cited by examiner

OBJECT THREE-DIMENSIONAL LOCALIZATIONS IN IMAGES OR VIDEOS

CROSS-REFERENCE TO RELATED APPLICATION

This application is a continuation of International Patent Application No. PCT/M2020/061548, filed on Dec. 4, 2020, and titled "OBJECT THREE-DIMENSIONAL LOCALIZATIONS IN IMAGES OR VIDEOS," which is incorporated by reference herein in its entirety.

BACKGROUND

Image capturing devices generally use a monocular camera to capture images before the camera. The image is then stored in an image file which may be subsequently displayed on screen or reproduced on other media. Although the objects before the image capturing device are three-dimensional, the representation in an image file captured by a monocular camera is two-dimensional. When viewing images, people are often able to infer three-dimensional locations of objects in a two-dimension image based on an ability to analyze three-dimensional structure from a two-dimensional image using various cues that may be present in the images.

Various computer vision algorithms have been developed to generate three-dimensional data from a camera system. For example, a synchronized multi-view system can be used to reconstruct in three-dimensions an object by three-dimensional triangulation. Combining three-dimensional localization from multiple monocular systems can also be a solution to generate the three-dimensional object localization.

BRIEF DESCRIPTION OF THE DRAWINGS

Reference will now be made, by way of example only, to the accompanying drawings in which.

DETAILED DESCRIPTION

Figure 1:
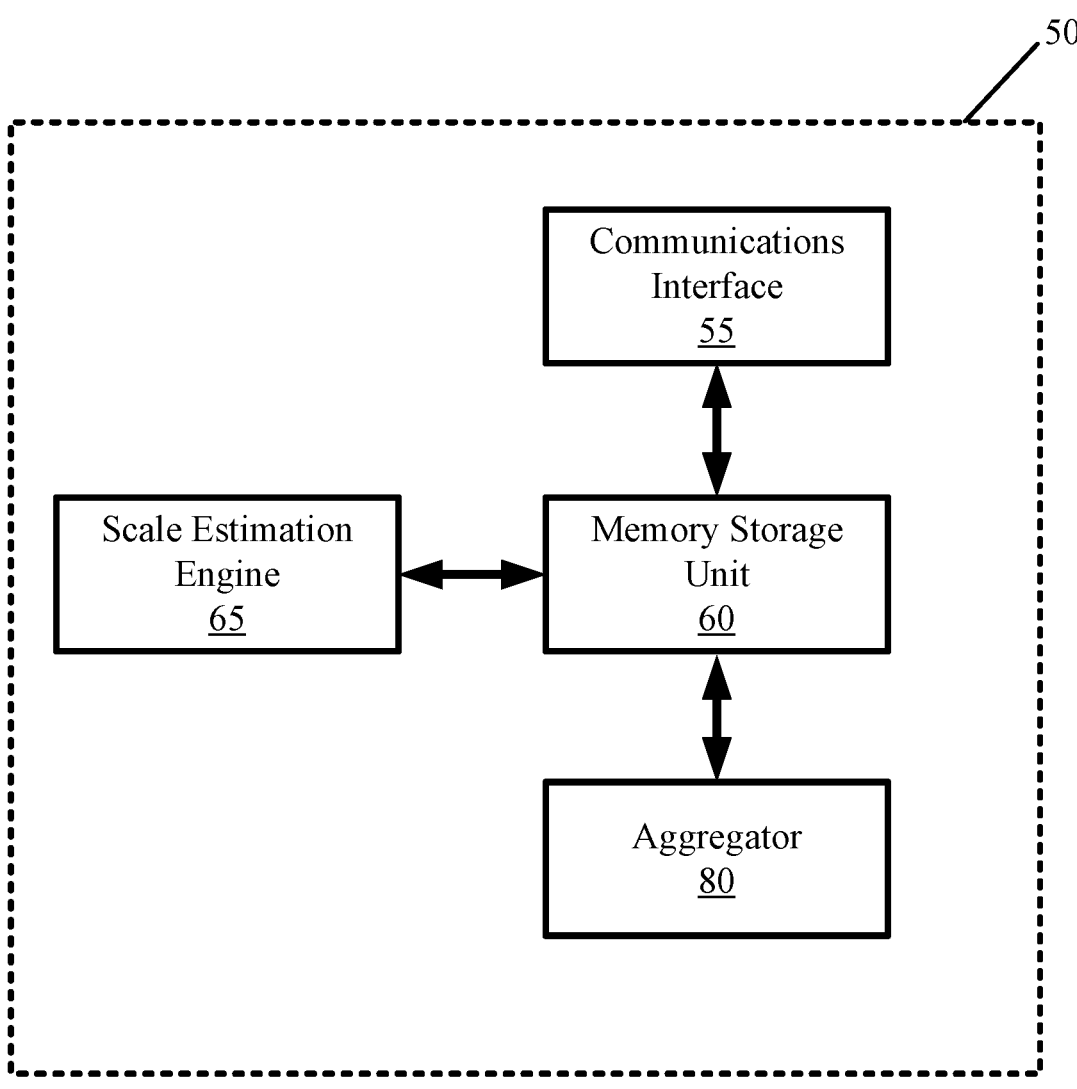
FIG. 1 is a schematic representation of the components of an example apparatus to estimate a three-dimensional location of a root position from a two-dimensional image taken by a monocular camera system.

As used herein, any usage of terms that suggest an absolute orientation (e.g. "top", "bottom", "up", "down", "left", "right", "low", "high", etc.) may be for illustrative convenience and refer to the orientation shown in a particular figure. However, such terms are not to be construed in a limiting sense as it is contemplated that various components will, in practice, be utilized in orientations that are the same as, or different than those described or shown.

Systems capturing image with a monocular camera have become common. For example, many portable electronic devices, such as phones, now include a camera system for capturing images. Images captured by the portable electronic device may include a representation of an object, such as a person. Although a person viewing the two-dimensional image may be able to infer a three-dimensional location of the object, it may not be an easy task for many portable electronic devices. Identifying the location of the object in three-dimensional space may be used for additional processing. For example, the object may be tracked in a video for further analysis. In other examples, movements in three dimension may be recorded for subsequent playback. As another example, objects may be tracked to generate aminations, such as for generating augmented reality features.

In order to track and estimate the position of an object in three-dimensional space, a root position for the object is to be defined. Since some objects, such as human body may change shape and form, such as between a T-pose and another human pose, a root position for a point of the object that does not move substantially relative to other portions of the object is generally chosen. For example, the root position of a human may be a point defined as the midway point between the hip joints. In other examples, the root position may be a point defined at the base of the neck or as some other point centrally located in the body. Accordingly, the location of the root position of the object may be understood to be the general position of the object in three-dimensional space and that movement of the root position over time may be considered to generally correspond to movement of the object as a whole instead of a movement of a portion of the object, such as a hand waving gesture.

An apparatus and method for estimating the three-dimensional root position of an object is provided. The apparatus is not particularly limited and may be any monocular camera system including ones on portable electronic devices, such as a smartphone or tablet. By using the image captured with the monocular camera system, the apparatus may estimate the root position of an object in three-dimensional space. In an example, the apparatus may use known reference data associated with the object to estimate the three-dimensional root position. In other examples, additional methods of estimations may be used to make multiple estimates which can be aggregated to reduce any error that may be associated with a single method.

Referring to FIG. 1, a schematic representation of an apparatus to estimate a three-dimensional location of a root position from a two-dimensional image taken by a monocular camera system is generally shown at 50. The apparatus 50 may include additional components, such as various additional interfaces and/or input/output devices such as indicators to interact with a user of the apparatus 50. The interactions may include viewing the operational status of the apparatus 50 or the system in which the apparatus 50 operates, updating parameters of the apparatus 50, or resetting the apparatus 50. In the present example, the apparatus 50 includes a communications interface 55, a memory storage unit 60, a scale estimation engine 65, and an aggregator 80.

The communications interface 55 is to receive raw data representing an actual object. The raw data is received from a monocular camera system where a single camera captures an image to generate a two-dimensional representation of the object in a three-dimensional space. The two-dimensional representation in the raw data is not particularly limited and may be a two-dimensional skeleton generated by a pose estimation model, such as the one used in the wrnchAI engine to estimate human poses. In examples where the object is not a person, another model for estimating poses may be used. Accordingly, the raw data received at the communications interface 55 may be preprocessed to some degree. The communications interface 55 is not particularly limited. For example, the apparatus 50 may be part of a smartphone or other portable electronic device that includes a monocular camera system (not shown) to capture the raw data. Accordingly, in this example, the communications interface 55 may include the electrical connections within the portable electronic device to connect the apparatus 50 portion of the portable electronic device with the camera system. The electrical connections may include various internal buses within the portable electronic device.

In other examples, the communications interface 55 may communicate with external source over a network, which may be a public network shared with a large number of connected devices, such as a WiFi network or cellular network. In other examples, the communications interface 55 may receive data from an external source via a private network, such as an intranet or a wired connection with other devices. As another example, the communications interface 55 may connect to another proximate device via a Bluetooth connection, radio signals, or infrared signals. In particular, the communications interface 55 is to receive raw data from the external source to be stored on the memory storage unit 60. The external source is not particularly limited and the apparatus 50 may be in communication with an external camera system or a remote camera system. For example, the monocular camera system may be a separate dedicated camera system, such as a video camera, webcam, or other image sensor. In other examples, the external source may be another portable electronic device, such as another smartphone or a file service.

The contents of the image represented by the raw data is not particularly limited and may be any two-dimensional representation of an object in three-dimension, such as a person, an animal, a vehicle. In general, the object of interest in the raw data for which the root position is to be estimated is an object that may move in three-dimensional space; however, the object may also be a stationary object in other examples. Continuing with the example of a person as the object in the raw data, the person may be standing in a T-pose position. In other examples, the person may also be an A-pose position or in a natural pose which may have one or more joints obstructed from the view of the camera system.

The memory storage unit 60 is to store the raw data received via the communications interface 55. In the present example, the memory storage unit 60 may store multiple two-dimensional images representing frames of video data in two-dimension for ultimately tracking movement of the object in three-dimensional space. In particular, the object may be a person moving and performing various actions, such as playing a sport or performing art, such as dancing or acting. Although the present example relates to a two-dimensional image of a person, it is to be appreciated with the benefit of this description that other examples may also include images that represent different types of objects, such as an animal or machine.

The memory storage unit 60 may be also used to store reference data to be used by the apparatus 50. For example, the memory storage unit 60 may store various reference data of a height of an object at a known distance from the camera. Continuing with the present example of a person as the object, the reference data may include one or more heights of a person at various distances from the monocular camera system. The generation of the reference data is not particularly limited and may be measured and calibrated for a specific camera system and transferred onto the memory storage unit 60. In other examples, the reference data may be obtained for a specific camera system during a calibration step where known information is provided for one or more calibration images.

In the present example, the memory storage unit 60 is not particularly limited includes a non-transitory machine-readable storage medium that may be any electronic, magnetic, optical, or other physical storage device. It is to be appreciated by a person of skill with the benefit of this description that the memory storage unit 60 may be a physical computer readable medium used to maintain databases, or may include multiple mediums that may be distributed across one or more external servers, such as in a central server or a cloud server. The memory storage unit 60 may be used to store information such as raw data received via the communications interface 55 and reference data that may be generated or also received via the communications interface 55. In addition, the memory storage unit 60 may be used to store additional data used to operate the apparatus 50 in general, such as instructions for general operation. Furthermore, the memory storage unit 60 may store an operating system that is executable by a processor to provide general functionality to the apparatus 50 such as functionality to support various applications. The memory storage unit 60 may additionally store instructions to operate the scale estimation engine 65 and the aggregator 80. Furthermore, the memory storage unit 60 may also store control instructions to operate other components and any peripheral devices that may be installed on the apparatus 50, such cameras and user interfaces.

The scale estimation engine 65 is to receive the raw data and the reference data from the memory storage unit. The scale estimation engine 65 then analyzes the raw data received via the communications interface 55 and the reference data stored in the memory storage unit 60 to calculate a root position of the object in the raw data. It is to be appreciated by a person of skill that the object and the definition of the root position is not particularly limited. In general, the root position of an object may be defined as a point of the object that best represents its location in three-dimensional space. Continuing with the example of a human as the object, the root position may be defined as the midpoint on a line between a left hip joint and a right hip joint of a three-dimensional skeleton representation of the person. In other examples, a different root position may be selected, such as the head of the three-dimensional skeleton, or more precisely, the midpoint on a line between a left eye and a right eye. As another example, the neck may also be selected as the root position.

The manner by which the scale estimation engine 65 calculates the root position is not particularly limited. For example, the scale estimation engine 65 may compare a reference height in the reference data with an actual height of the object in the raw data. In this example, the reference data includes a two-dimensional representation of a person captured by the camera system. The two-dimensional height (such as the height measure by number of pixels) of the person in the reference data is a known parameter and the position in three dimensional space, such as the distance from the camera of the monocular camera system is also a known parameter. The known parameters may be entered manually by a user or measured using a peripheral device such as a range sensor (not shown). In this example, the two-dimensional height of the actual person represented in the raw data may be assumed to be inversely proportional to the distance from the camera in three-dimensional space. Accordingly, the scale estimation engine 65 may be used to estimate the root position of the person in the raw data by determining the height, such as the number of pixels in the current example, of the person in the raw data. For that, the distance from the camera may be calculated and the root position subsequently obtained.

In other examples, it is to be appreciated that a root position of other types of objects may be calculated using a similar method. It is to be appreciated by a person of skill with the benefit of this description that the reference height is not particularly limited and may not be a height in some examples. In particular, the scale estimation engine 65 may use any reference distance that can be identified between two reference points in the reference data and the raw data. For example, the reference distance may be a bone segment, such as the distance between the hip and the ankle of the two-dimensional representation of a three-dimensional skeleton.

In the present example, the aggregator 80 is to generate output data based on the root position received from the scale estimation engine 65. The output data is not particularly limited and may be stored on the memory storage unit 60 for subsequent transmittal to an external device for further processing, In the present example, since there may be a single root position calculated by the scale estimation engine 65, the output data may be the root position itself. In other examples where the raw data includes video data, the aggregator 80 may combine the root position of multiple frames such that the output data represents tracking data.

Figure 2:
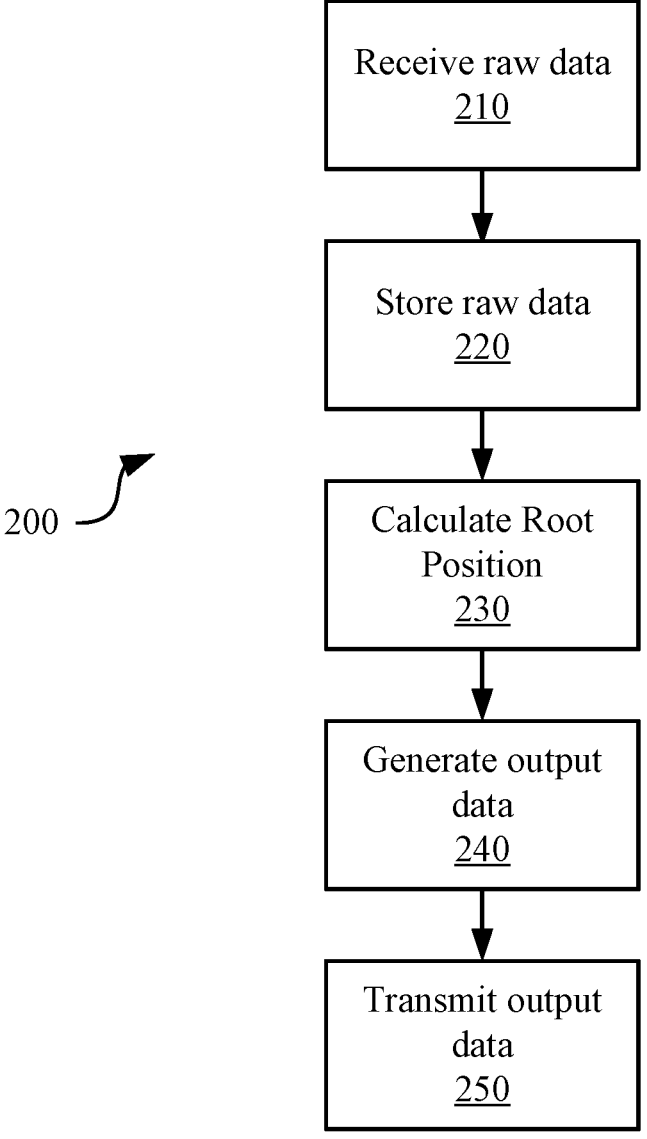
FIG. 2 is a flowchart of an example of a method of estimating a three-dimensional location of a root position from a two-dimensional image taken by a monocular camera system.

Referring to FIG. 2, a flowchart of an example method of estimating a three-dimensional location of a root position of an object in a two-dimensional image taken by a monocular camera system is generally shown at 200. In order to assist in the explanation of method 200, it will be assumed that method 200 may be performed by the apparatus 50. Indeed, the method 200 may be one way in which the apparatus 50 may be configured. Furthermore, the following discussion of method 200 may lead to a further understanding of the apparatus 50 and its components. In addition, it is to be emphasized, that method 200 may not be performed in the exact sequence as shown, and various blocks may be performed in parallel rather than in sequence, or in a different sequence altogether.

Beginning at block 210, the apparatus 50 receives raw data representing an actual object via the communications interface 55. In the present example, the raw data is a two-dimensional representation of an object. For example, the raw data may be an image file generated by sensor data from a monocular camera system. In other examples, the raw data may be received from an external source such as a file server or other external device. It is to be appreciated by a person of skill that the raw data may not originate from a camera system and may not be a photograph. In such examples, the raw data may be an artistic image created by a person or computing device. The manner by which the raw data represent an image with an object, such as the format of the two-dimensional image is not particularly limited. In the present example, the raw data may be received in an RGB format. In other examples, the raw data be in a different format, such as a raster graphic file or a compressed image file captured and processed by a camera system.

The contents of the image represented by the raw data is not particularly limited and may any two-dimensional representation of an object in three-dimension, such as a person, an animal, a vehicle. In general, the object of interest in the raw data for which the root position is to be estimated is an object that may move in three-dimensional space; however, the object may also be a stationary object in other examples. The orientation of the object is not particularly limited as well. In an example where the object in the raw data is a person, the person may be standing in a T-pose position. In other examples, the person may also be an A-pose position or in a natural pose which may have one or more joints obstructed from the view of the camera system.

Once received at the apparatus 50, the raw data is to be transferred to the memory storage unit 60 where it is stored for subsequent use by the scale estimation engine at block 220. Furthermore, block 220 includes storing reference data in the memory storage unit 60. The reference data is not particularly limited and may be measured and calibrated for a specific camera system and transferred onto the memory storage unit 60 via the communications interface 55 or a portable memory storage device, such as a flash drive. In other examples, the reference data may be obtained for a specific camera system during a calibration step where known information is provided for one or more calibration images.

Block 230 involves calculating the root position in three-dimensional space of an object representing in a two-dimensional image in the raw data. In the present example, the root position is calculated by the scale estimation engine 65 by analyzing the raw data based on the references data stored in the memory storage unit 60. The manner by which the root position is calculated is not particularly limited and may involve comparing a reference height of the reference object in an image (measured by the number of pixels in the image) represented by the reference data with an actual height of the object in the raw data. The two-dimensional height of the object represented in the raw data (measured by the number of pixels in the image) may be assumed to be inversely proportional to the distance from the camera in three-dimensional space. Accordingly, the root position of the person in the raw data is estimated with a comparison to the reference data and using the known parameters in the reference data.

Next, block 240 comprises generating output data based on the root position calculated at block 230. In the present example, since there may be a single root position calculated by the scale estimation engine 65, the output data may be the root position itself. In other examples where the raw data includes video data, the aggregator 80 may combine the root position of multiple frames to generate tracking data as the output data. Block 250 subsequently transmits the output data to an external device for further processing. It is to be appreciated by a person of skill with the benefit of this description that in some examples, block 250 may transmit the output data internally within the same device or system. For example, if the apparatus 50 is part of a portable electronic device such as a smartphone capable of additional post processing functions, the output data may be used within the same portable electronic device.

Figure 3:
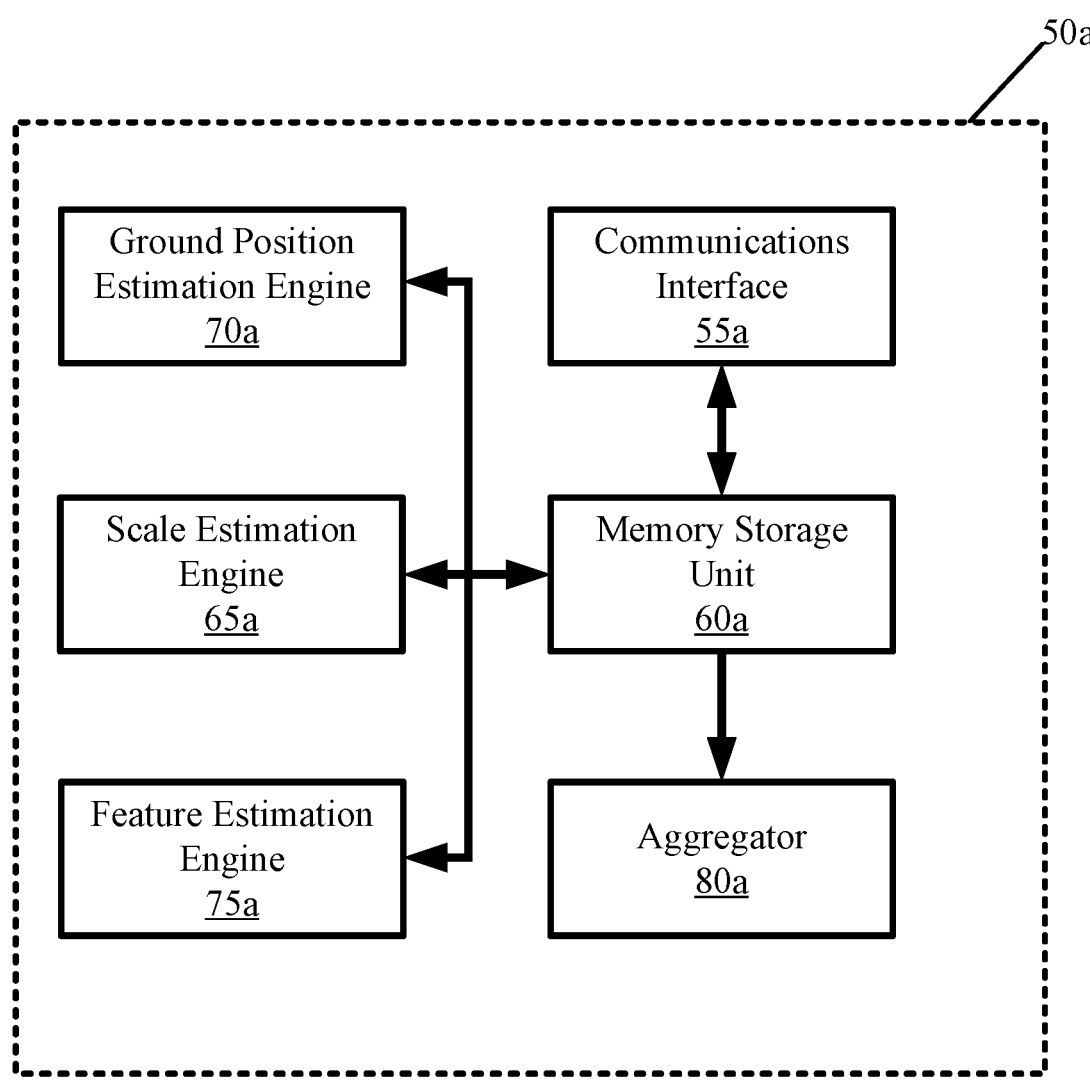
FIG. 3 is a schematic representation of the components of another example apparatus to estimate a three-dimensional location of a root position from a two-dimensional image taken by a monocular camera system.

Referring to FIG. 3, another schematic representation of an apparatus 50*a* to estimate a three-dimensional location of a root position from a two-dimensional image taken by a monocular camera system is generally shown. Like components of the apparatus 50*a* bear like reference to their counterparts in the apparatus 50, except followed by the suffix "a". In the present example, the apparatus 50*a* includes a communications interface 55*a*, a memory storage unit 60*a*, a scale estimation engine 65*a*, a ground position estimation engine 70*a*, a feature estimation engine 75*a*, and an aggregator 80*a*.

In the present example, the apparatus 50*a* includes a scale estimation engine 65*a*, a ground position estimation engine 70*a*, and a feature estimation engine 75*a* to estimate the root position of the object in the raw data. The scale estimation engine 65*a* functions substantially similar to the scale estimation engine 65 to calculate the root position based on relative scales of a measurement between reference data and the raw data received via the communications interface 55*a*.

The ground position estimation engine 70*a* is to calculate a root position of the object using a ground position relative to the camera. In particular, the ground position estimation engine 70*a* is to determine a ground position based on the object in the two-dimensional image of the raw data received via the communications interface 55*a*. The ground position may be determined by identifying a feature of the object assumed to be on the ground plane and applying a homography. For example, if the object is a person, the feet of the person may be assumed to be on the ground. The homography may then be applied to the two-dimensional position in the image of the raw data to determine a position on the ground plane In the present example, a calibration engine may be used to define the homography to transform between the two-dimensional image of the image in the raw data and a three-dimensional representation with a ground plane. The manner by which the calibration engine defines the homography is not particularly limited and may involve various plane detection or definition methods.

Figure 4A:
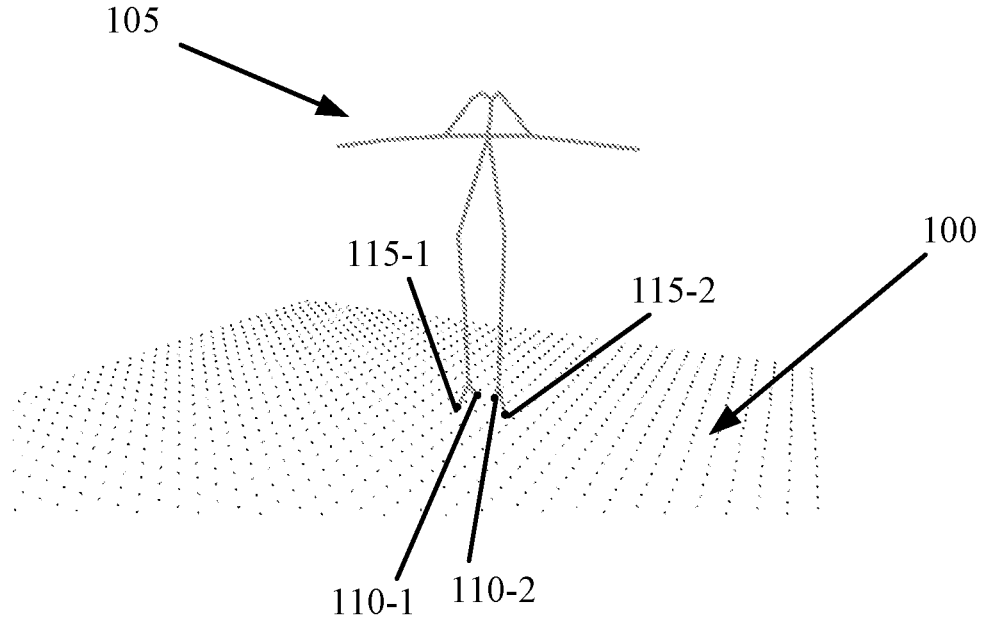
FIG. 4A is an example of raw data representing a skeleton of an object in a ground-plane coordinate system.

The initial calibration step may involve detecting a ground plane in three-dimensional space. The determination of a ground plane is no limited and may involve performing a calibration method with the camera system. For example, a native program or module such as ARKit available on iOS devices may be used to calibrate a monocular camera system on a smartphone or tablet. In this example, the program may use images from multiple viewpoints obtained by moving the device in space to generate a ground plane 105 relative to a camera coordinate system as determined by the module, such as ARKit, as shown in FIG. 4A.

Figure 4B:
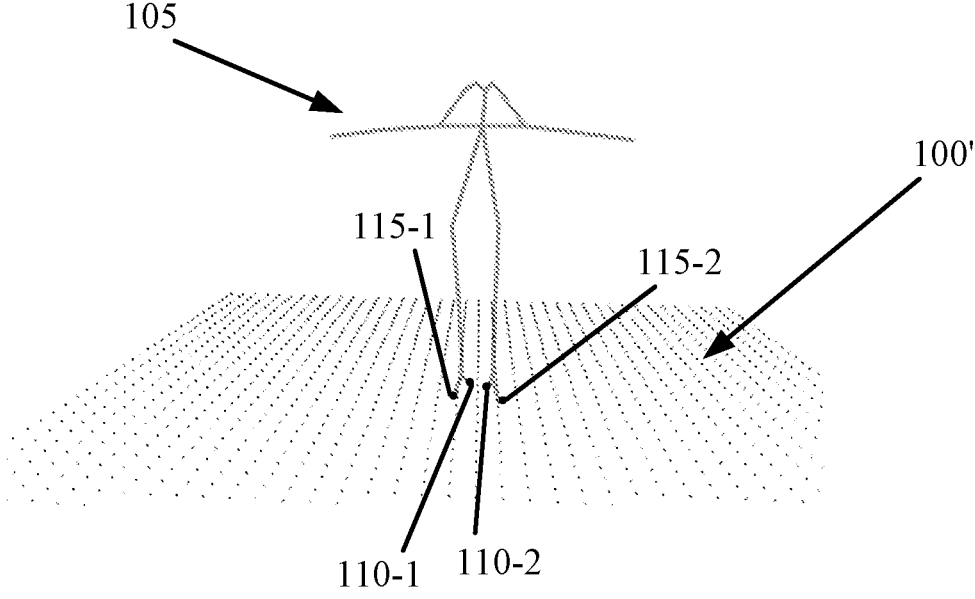
FIG. 4B is an example of raw data representing a skeleton of an object in a T-pose coordinate system.

Upon the determination of the ground plane 100 in the camera coordinate system, the calibration engine may transform the ground plane 100 in the camera coordinate system to a ground plane 100' in a T-pose reference system where the skeleton 105 in the T-pose position faces the camera as shown in FIG. 4B. By transforming the ground plane 100 to the ground plane 100', it is to be appreciated that the height of the object may be more readily obtained from the two-dimension image as the ground plane 100 determined by the module may not involve a rotated or non-centered skeleton 105.

Continuing with the present example, the ground position estimation engine 70*a* be used to identify the root position of a person standing in a T-pose. First, the ground position estimation engine 70*a* may identify the heel joints 110-1, 110-2 (generically, these heel joints are referred to herein as "heel joint 110" and collectively they are referred to as "heel joints 110") and the toe joints 115-1 and 115-2 (generically, these toe joints are referred to herein as "toe joint 115" and collectively they are referred to as "toe joints 115") in the two-dimensional image of the raw data. The ground position estimation engine 70*a* determines the location of the feet of the person to be the midpoint average between each heel joint 110 and toe joint 115. With the location of the feet known, the ground position estimation engine 70*a* translates the two-dimensional location in image from the raw to the T-pose system on the plane 100' with the defined homography as determined by the calibration engine.

Although the above example describes both feet of the person on the ground, it is to be appreciated that in examples where the person has only one foot on the ground may also be used by the ground position estimation engine 70*a* be used to identify the root position. In such an example, a projection of the pelvis on the floor may be determined using the normal to the ground plane may be used. In particular, the location of the feet in this case may be represented by the projection of the feet on the floor on the ground plane normal going through pelvis position.

After the position on the plane 100' is calculated, the height of the root position about the ground plane 100' is to be determined. Continuing with the example of a person with a root position between the hip joints, height may be determined from the camera distance knowing the position and orientation of the ground plane relative to the camera. Upon determining the distance from the camera to the person represented by the skeleton 105, the height and width of the skeleton 105 in three-dimensional space may be determined. In particular, the camera distance may be used to determine the height of the root position above the plane 100'

It is to be appreciated that variations are possible and that the determination of a root position in three-dimensional space may involve other transformations and planes. For example, in some examples, the homography for a known camera system may be pre-defined and directly uploaded to the memory storage unit 60*a*. Accordingly, in such examples, the ground position estimation engine 70*a* would not use a separate calibration engine prior to making the ground position estimation. Instead, the ground position estimation engine 70*a* may use the known homography.

The feature estimation engine 75*a* is to calculate a root position of the object by applying a three-dimensional pose estimation process on a feature of the object representing in the two-dimensional image of the raw data. In the present example, the feature estimation engine 75*a* based on the two-dimensional projection of a feature, such as a torso of a person, three-dimensional measurements of the feature, and intrinsic parameters of a camera to estimate the root position. As a specific example, a Perspective-n-point algorithm may be performed on the input parameters to provide a location of the root position in the camera coordinate system (FIG. 4A), which may be transformed into the T-pose coordinate system (FIG. 4B).

The aggregator 80*a* is to generate output data based on the root positions received from the scale estimation engine 65*a*, the ground position estimation engine 70*a*, and the feature estimation engine 75*a*. In the present example, the aggregator 80*a* is to combine the root position calculated by each of the scale estimation engine 65*a*, the ground position estimation engine 70*a*, and the feature estimation engine 75*a* to provide a combined root position as the output data. The manner by which the aggregator 80*a* combines the root positions from the scale estimation engine 65*a*, the ground position estimation engine 70*a*, and the feature estimation engine 75*a* is not particularly limited. In the present example, the aggregator may calculate the average of the root positions received from each of the scale estimation engine 65*a*, the ground position estimation engine 70*a*, and the feature estimation engine 75*a* and provide the average as the output data.

In some examples, the aggregator 80*a* may calculate a weighted average of the root positions as determined by each of the scale estimation engine 65*a*, the ground position estimation engine 70*a*, and the feature estimation engine 75*a*. The weighting of the scale estimation engine 65*a*, the ground position estimation engine 70*a*, and the feature estimation engine 75*a* is not particularly limited and may be dependent on prior knowledge in some examples. For example, prior knowledge may include previously determined root positions, such as when an object is being tracked. In this example, the weighting may be dependent on the distance from a previously calculated root position, such as being inversely proportional to the previous distance.

In further examples, the aggregator 80*a* may use a trained model to generate the output data from the positions as determined by each of the scale estimation engine 65*a*, the ground position estimation engine 70*a*, and the feature estimation engine 75*a*. The model may include a machine learning model that may generate a reliable estimated root position from noisy root positions determined by each of the scale estimation engine 65*a*, the ground position estimation engine 70*a*, and the feature estimation engine 75*a*.

In further examples, the aggregator 80*a* may discard outlier determinations of root position from any one or more of the scale estimation engine 65*a*, the ground position estimation engine 70*a*, and the feature estimation engine 75*a*. The outlier may be determined based on a distance from a previously measure root position from prior knowledge. In this example, a predetermined threshold may be used to identify outliers.

It is to be appreciated by a person of skill with the benefit of this description that the scale estimation engine 65*a*, the ground position estimation engine 70*a*, and the feature estimation engine 75*a* may each fail to provide a reasonable estimate of the root positions. Each of the scale estimation engine 65*a*, the ground position estimation engine 70*a*, and the feature estimation engine 75*a* may have inherent weaknesses in the model for certain images captured in the raw data. For example, the scale estimation engine 65*a* may be inaccurate if the height in the raw data cannot be accurately identified and compared with the reference data due to a person being in an unusual pose that cannot be identified by a pose estimator. In the case of the ground position estimation engine 70*a*, the estimate of the root position may be affected if the feet of the person is not on the ground, such as if the person jumped or lifted a leg off the ground. The feature estimation engine 75*a* may fail if the feature, such as the torso, was not visible or was twisted. Accordingly, a voting system may be used or an outlier may be identified as being a threshold distance away from the root position calculated by the other two estimation engines.

In further examples, it is to be understood that variations are possible. For example, it is to be understood that each of the scale estimation engine 65*a*, the ground position estimation engine 70*a*, and the feature estimation engine 75*a* may provide an estimate of the root position. Accordingly, one or more of the scale estimation engine 65*a*, the ground position estimation engine 70*a*, and the feature estimation engine 75*a* may be omitted in some examples. Furthermore, it is to be appreciated by a person of skill with the benefit of this description that one or more other engines with different methods of estimating root position could be added to the apparatus 50*a*. The additional engines may calculate additional root positions for the aggregator 80*a* to combine using the methods described above.

Figure 5:
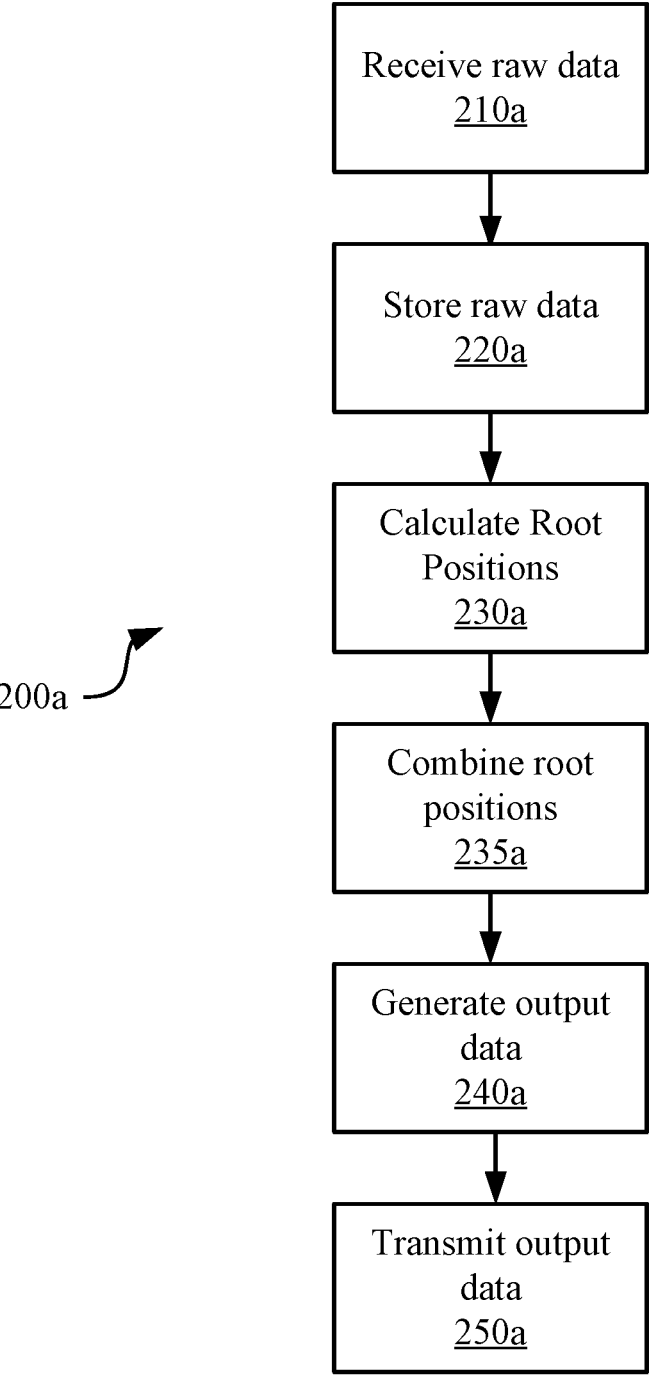
FIG. 5 is a flowchart of another example of a method of estimating a three-dimensional location of a root position from a two-dimensional image taken by a monocular camera system.

Referring to FIG. 5, a flowchart of another example method of estimating a three-dimensional location of a root position of an object in a two-dimensional image taken by a monocular camera system is generally shown at 200*a*. In order to assist in the explanation of method 200*a*, it will be assumed that method 200*a* may be performed by the apparatus 50*a*. Indeed, the method 200*a* may be one way in which the apparatus 50*a* may be configured. Furthermore, the following discussion of method 200*a* may lead to a further understanding of the apparatus 50*a* and its components. In addition, it is to be emphasized, that method 200*a* may not be performed in the exact sequence as shown, and various blocks may be performed in parallel rather than in sequence, or in a different sequence altogether. Like components of the method 200*a* bear like reference to their counterparts in the method 200, except followed by the suffix "a". In the present example, blocks 210*a*, 220*a*, 240*a*, and 250*a* are substantially similar to blocks 210, 220, 240, and 250.

Block 230*a* involves calculating the root positions in three-dimensional space of an object representing in a two-dimensional image in the raw data using multiple methods, such as with the scale estimation engine 65*a*, the ground position estimation engine 70*a*, and/or the feature estimation engine 75*a*. In an example, the root position may be calculated by the scale estimation engine 65*a* by analyzing the raw data based on the references data stored in the memory storage unit 60*a*. The root position may also be calculated by the ground position estimation engine 70*a* based on determining a ground position on a ground plane based on a homography. The homography is not particularly limited and may be defined using a calibration engine or provided for a known camera system. Furthermore, the root position may be calculated based on applying a three-dimensional pose estimation process on a feature of the object in the raw data, such as a torso of a person. It is to be appreciated that by using multiple methods, a relatively precise root position estimate may be obtained even if one of the scale estimation engine 65*a*, the ground position estimation engine 70*a*, and/or the feature estimation engine 75*a* fails to provide an accurate estimate.

Next, block 235*a* comprises combining the calculated root positions from each of the scale estimation engine 65*a*, the ground position estimation engine 70*a*, and/or the feature estimation engine 75*a* from block 230*a*. The manner by which the root positions re combined is not particularly limited. For example, the aggregator 80*a* may take a simple average of the calculated root positions received from block 230*a*. In other examples, the aggregator may weigh the values received from block 230*a* based on various factors, such as prior knowledge. In further examples, the aggregator 80*a* may also discard outlier values received from block 230*a* to reduce the effect of model errors. The combined root position is then used to generate output data at block 240*a*.

Figure 6:
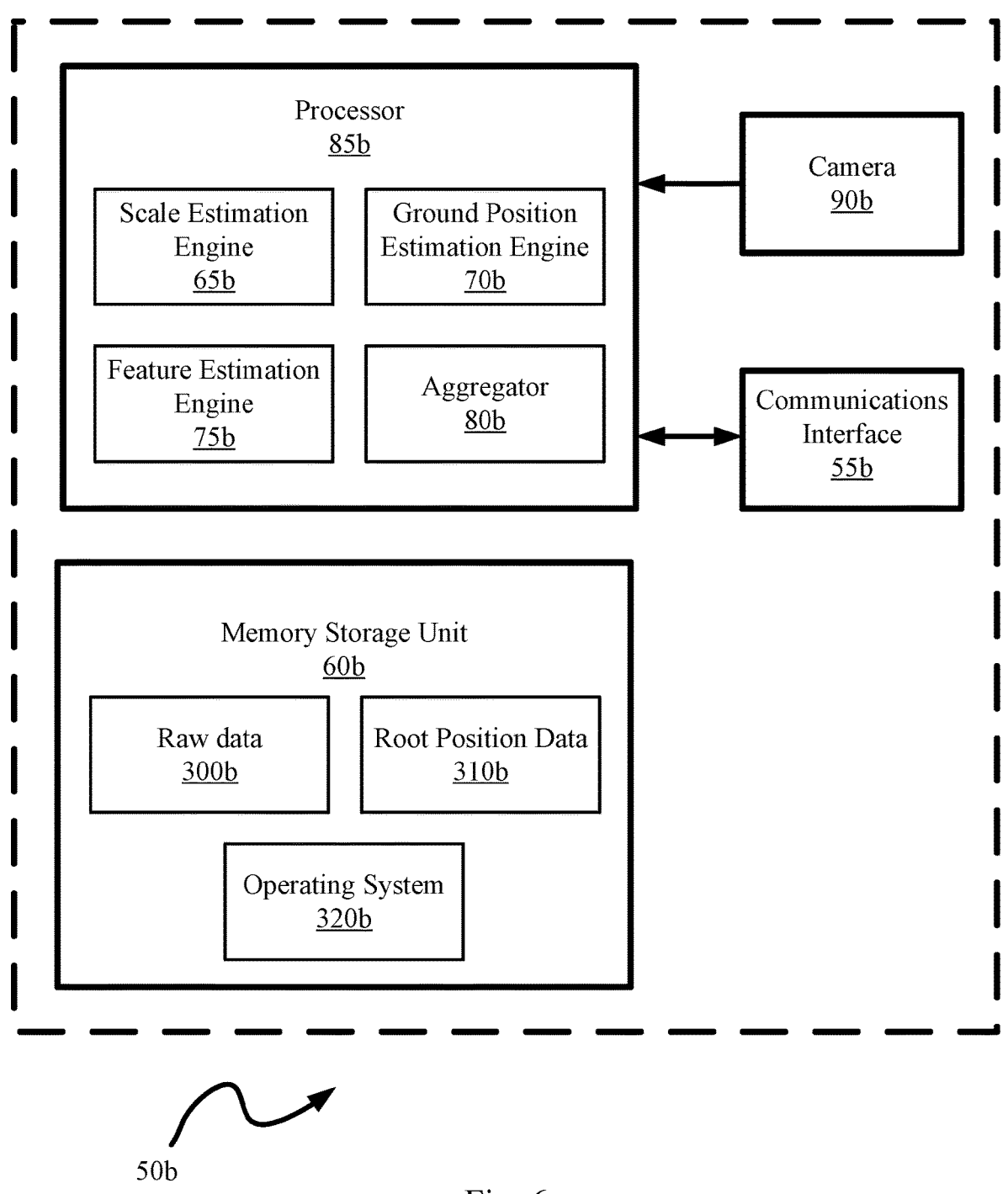
FIG. 6 is a schematic representation of the components of another example apparatus to estimate a three-dimensional location of a root position from a two-dimensional image taken by a monocular camera system.

Referring to FIG. 6, another schematic representation of an apparatus 50*b* to estimate a three-dimensional location of a root position from a two-dimensional image taken by a monocular camera system is generally shown. Like components of the apparatus 50*b* bear like reference to their counterparts in the apparatus 50*a*, except followed by the suffix "b". In the present example, the apparatus 50*b* includes a communications interface 55*b*, a memory storage unit 60*b*, a processor 85*b*, and a camera 90*b*. The processor 85*b* is to operate a scale estimation engine 65*b*, a ground position estimation engine 70*b*, a feature estimation engine 75*b*, and an aggregator 80*b*.

In the present example, the memory storage unit 60*b* may also maintain databases to store various data used by the apparatus 50*b*. For example, the memory storage unit 60*b* may include a database 300*b* to store raw data, such as images received from the camera 90*b*, a database 310*b* to store the root position estimates generated the scale estimation engine 65*b*, the ground position estimation engine 70*b*, and/or the feature estimation engine 75*b*. In addition, the memory storage unit 60*b* may include an operating system 320*b* that is executable by the processor 85*b* to provide general functionality to the apparatus 50*b*. Furthermore, the memory storage unit 60*b* may be encoded with codes to direct the processor 85*b* to carry out specific steps to perform the method 200 or the method 200*a*. The memory storage unit 60*b* may also store instructions to carry out operations at the driver level as well as other hardware drivers to communicate with other components and peripheral devices of the apparatus 50*b*, such as various user interfaces to receive input or provide output. Furthermore, the memory storage unit 60*b* may also store calibration information, such as camera intrinsics, ground plane localizations and homographies.

The camera 90*b* is a monocular camera system to capture an image as raw data. In the present example, the raw data may be captured in an RGB format. In other examples, the raw data be in a different format, such as a raster graphic file or a compressed image file. In the present example, it is to be appreciated by a person of skill with the benefit of this description that the apparatus 50*b* may be a portable electronic device, such as a smartphone with a camera 90*b*.

It should be recognized that features and aspects of the various examples provided above may be combined into further examples that also fall within the scope of the present disclosure.

What is claimed is:

1. An apparatus comprising:
   a communications interface at which to receive raw data that includes a representation of a human in two dimensions;
   a memory storage unit in which to store the raw data and reference data;
   a scale estimation engine that is configured to:
      receive the raw data and the reference data, and
      calculate a first root position of the human in a three-dimensional space based on an analysis of the raw data with the reference data;
   a calibration engine that is configured to define a homography;
   a ground position estimation engine that is configured to:
      determine a ground position based on the raw data and the homography, and
      calculate a second root position;
   a feature estimation engine that is configured to calculate a third root position by applying a three-dimensional pose estimation process on a feature of the human; and
   an aggregator that is configured to;
      calculate a weighted average of the first root position, the second root position, and the third root position to generate output data,
         wherein the weighted average is based on prior knowledge of the first root position, the second root position, and the third root position, and
      wherein the output data is to be transmitted to an external device.

2. The apparatus of claim 1, wherein the scale estimation engine is further configured to compare a reference height in the reference data with an actual height in the raw data to determine a first root position.

3. The apparatus of claim 1, wherein the aggregator determines whether one of the first root position, the second root position, and the third root position is an outlier, and wherein the aggregator discards the outlier.

4. A method comprising:
   receiving, via a communications interface, raw data that includes a representation of an actual object in two dimensions;
   storing the raw data and reference data in a memory storage unit;
   calculating a first root position of the actual object in a three-dimensional space based on an analysis of the raw data with the reference data by a scale estimation engine;
   generating output data based on the first root position;
   defining a homography with a calibration engine;
   determining a ground position based on the raw data and the homography with a ground position estimation engine;
   calculating a second root position with the ground position estimation engine based on the ground position;
   calculating a third root position by applying a three-dimensional pose estimation process on a feature of the actual object with a feature estimation engine;
   averaging, with an aggregator, the first root position, the second root position, and the third root position by calculating a weighted average to generate the output data; and
   transmitting the output data to an external device.

5. The method of claim 4, wherein calculating the first root position comprises comparing a reference height in the reference data with an actual height in the raw data to determine a first root position.

6. The method of claim 4, further comprising basing the weighted average on prior knowledge of the first root position, the second root position, and the third root position.

7. The method of claim 6, further comprising:
   determining whether one of the first root position, the second root position, and the third root position is an outlier; and
   discarding the outlier.

8. The method of claim 4, wherein the actual object is a human.

9. A non-transitory computer readable medium encoded with codes, wherein the codes are to direct a processor to:
   receive raw data via a communications interface,
      wherein the raw data includes a representation of a person in two dimensions;
   store the raw data and reference data in a memory storage unit;
   calculate a first root position of the person in a three-dimensional space based on an analysis of the raw data with the reference data;
   generate output data based on the first root position;
   define a homography;
   determine a ground position based on the raw data and the homography;
   calculate a second root position based on the ground position;
   calculate a third root position by applying a three-dimensional pose estimation process on a feature of the person;

calculate a weighted average of the first root position, the second root position, and the third root position to generate the output data; and transmit the output data to an external device.

10. The non-transitory computer readable medium of claim 9, wherein the codes are to direct the processor to:

calculate the first root position comprises comparing a reference height in the reference data with an actual height in the raw data to determine a first root position.

11. The non-transitory computer readable medium of claim 9, wherein the codes are to direct the processor to base the weighted average on prior knowledge of the first root position, the second root position, and the third root position.

12. The non-transitory computer readable medium of claim 9, wherein the codes are to direct the processor to:

determine whether one of the first root position, the second root position, and the third root position is an outlier; and discard the outlier.

* * * * *